UNITED STATES PATENT OFFICE.

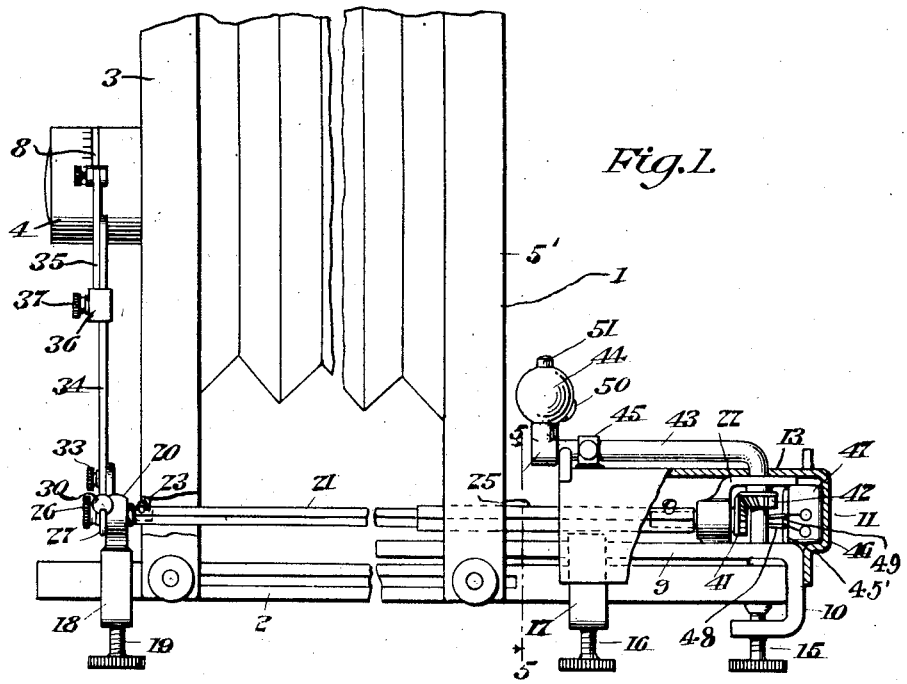

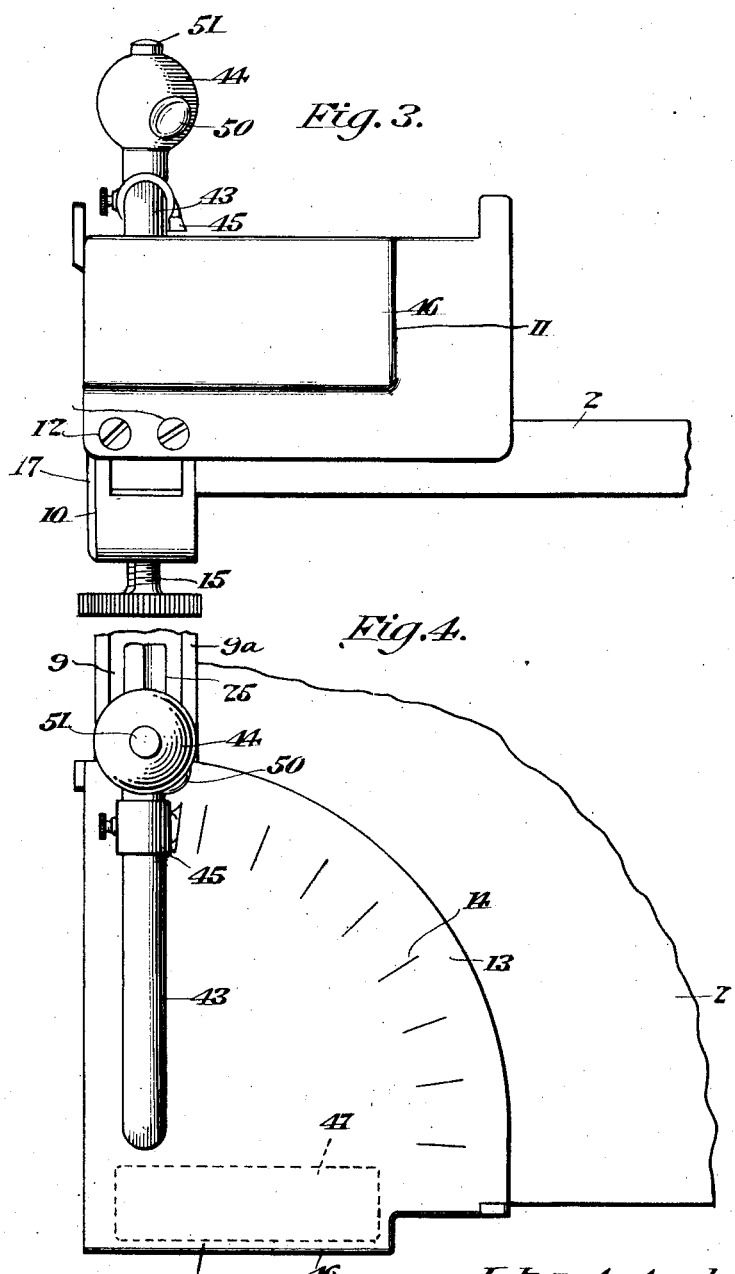

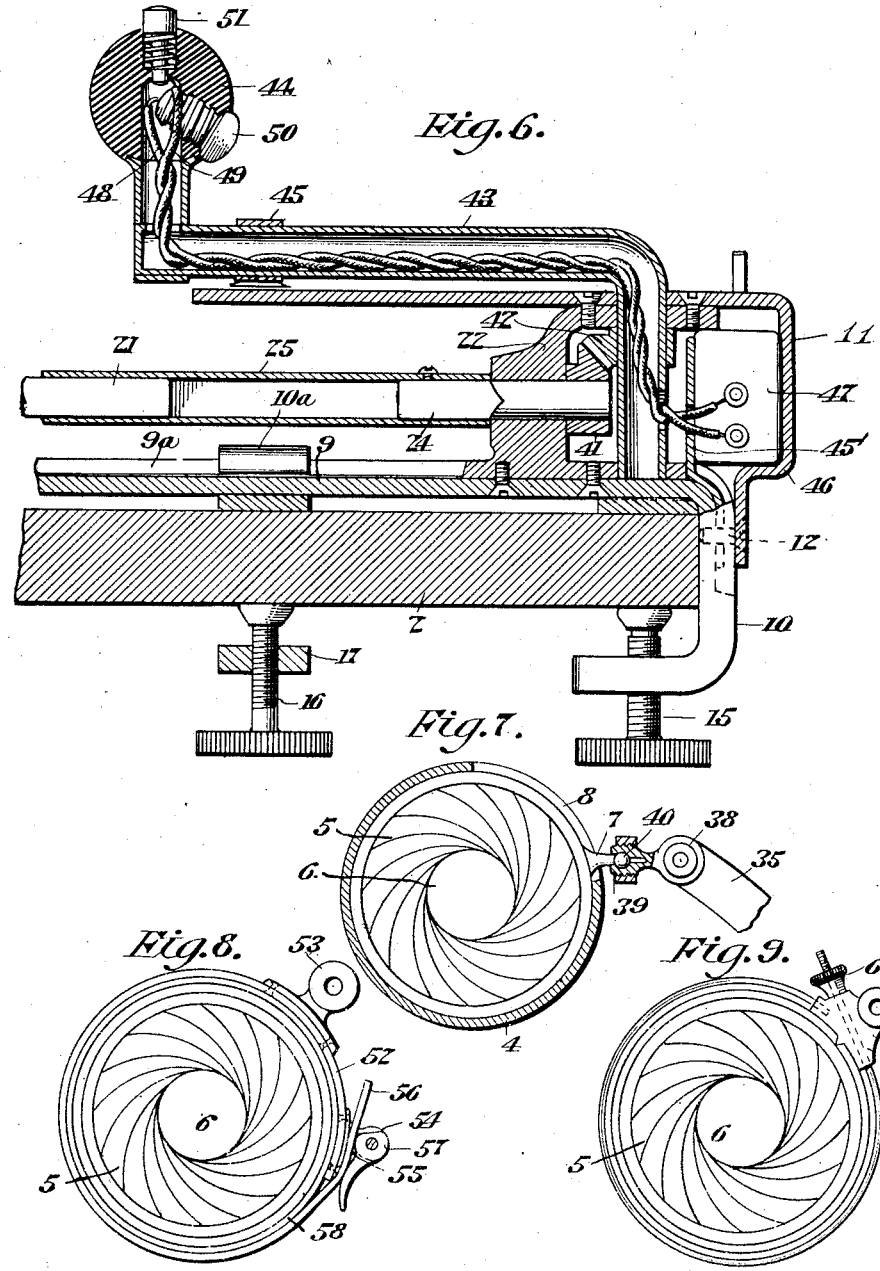

JOHN A. ANDRUSHES, OF AMSTERDAM, NEW YORK.

DIAPHRAGM-CONTROLLING ATTACHMENT FOR CAMERAS.

1,313,872.  Specification of Letters Patent.  Patented Aug. 26, 1919.

Application filed February 27, 1917. Serial No. 151,346.

*To all whom it may concern:*

Be it known that I, JOHN A. ANDRUSHES, a citizen of the United States, residing at Amsterdam, in the county of Montgomery and State of New York, have invented new and useful Improvements in Diaphragm-Controlling Attachments for Cameras, of which the following is a specification.

This invention relates to a diaphragm controlling attachment for photographic cameras, the primary object of the invention being to provide an attachment whereby the diaphragm or shutter of the camera may be opened or closed to any desired degree, to vary the size of the light opening, through means which may be manipulated from the rear of the camera.

A further object of the invention is to provide a simple, reliable and efficient means which may be actuated by the operator, during the focusing action to adjust the diaphragm, without the necessity of removing the focusing cloth from his head or going to the front of the camera.

A still further object of the invention is to provide an attachment of the character described which may be applied to any ordinary type of camera, and which is adjustable according to the size of the camera.

A still further object of the invention is to provide means whereby the extent of adjustment of the shutter diaphragm will be indicated to the operator at the rear of the camera, and whereby the darkened space inclosed by the focusing cloth may be illuminated to bring the indicating means into clear view.

The invention consists of the features of construction, combination and arrangement of parts hereinafter fully described and claimed, reference being had to the accompanying drawings in which:

Figure 1 is a side elevation showing the application of the device to a camera.

Fig. 2 is a front elevation of the same.

Fig. 3 is a rear elevation.

Fig. 4 is a top plan view.

Fig. 5 is a sectional detail view taken on the line 5—5 in Fig. 1.

Fig. 6 is a section through the operating handle, showing the indicator illuminating means.

Fig. 7 is a detail view of the connection between the diaphragm and the coöperating part of the actuating mechanism.

Figs. 8 and 9 are detail views showing modified forms of devices for connecting the actuating mechanism with the diaphragm.

Referring to the drawings, the numeral 1 designates a photographic camera of well known construction including a base frame 2, the adjustable front board 3 carrying the lens tube 4 provided with the adjustable diaphragm or light opening regulator 5. The lens board 3, as is customary, is slidable longitudinally with respect to the base frame and the back member 5' is likewise longitudinally slidable with respect to the base frame for a focusing action in the ordinary manner.

The diaphragm 5 may be and preferably is of that type composed of a series of circumferentially and radially adjustable sections, slidably movable with relation to each other to vary the size of light aperture 6 and having a projecting stud or operating member 7 movable in a slot 8 in the lens tube.

The attachment of the present invention comprises a bracket bar or member 9 having at its rear end a U-shaped clamp 10 engaging the base 2 with which the said clamp member may be securely connected by means of thumb screws 15, thereby supporting the bracket member 9 securely with respect to the said base 2. The clamp member 10 also supports a frame or housing 11 which may be secured thereon by screws or other suitable fastenings 12 and the top portion of which constitutes a horizontally disposed dial plate or indicating member 13 provided with a graduated scale 14 conforming to the usual scale upon the lens tube for indicating the degree of opening movement of the diaphragm. The bracket member 9 extends longitudinally of the base frame 2 on which latter a clamp 17 is detachably secured by a thumb screw 16, said clamp being provided with grooved guide members 10ª wherein the bracket member 9 is slidably guided, said bracket member being provided with upstanding flanges 9ª that engage the grooved side members, thereby assembling the parts securely against vertical or transverse movement without interfering with the longitudinal sliding movement of the bracket member 9 with respect to the clamp member 17. The latter is overhung by the outer side wall of the frame or housing 11 as will be best seen in Fig. 5, A third clamping member 18 having a clamping screw 19 engages the base frame 2 adjacent to the front board 3, said clamp member being adjustable with respect to the base frame to permit longitudinal movement of the front member 3. The clamping member 18 and the bracket member 9 are respectively provided with upwardly extending bearing members 20 and 22 respectively said bearing members receiving rotary shafts 23 and 24 respectively. On the shaft 23 is fixed a non-circular tube 21, and on the shaft 24 is fixed a similar non-circular tube 25, the tubes 21 and 25 being of such size in cross section that one may telescope within the other, so as to permit longitudinal adjustment while, by reason of the non-circular formation of the telescoping tubes, rotary motion will be transmitted between the shafts 23 and 24 when one or the other is rotated about its axis.

Fixed on the shaft 23 by means of a thumb nut 26 is a horizontal arm 27 which extends laterally therefrom, said arm being provided with a pair of upstanding bearing lugs 28 in which are journaled the ends of a screw shaft 29 provided at one end with an adjusting head or wheel 30. Mounted upon the shaft 29 is a nut or traveler 31 having a grooved or bifurcated portion 32 which engages the upper edge of the arm 27 to hold the nut from rotation while permitting it to travel freely in either direction along the shaft 29. Pivoted at its lower end, as at 33, to the nut or traveler 31 is an upright actuating rod or bar 34 to which is pivotally coupled one end of a curved link 35, said link being directly pivoted to a sleeve 36 slidably engaging said bar 34 and adapted to be fixed thereto by a set screw 37, whereby the throw of the link may be varied as will be readily understood. The upper end of the link 35 is pivoted, as at 38, to a split coupling member 39 formed with a socket to receive a ball or head 40 formed upon the stud 7 of the shutter diaphragm 5, whereby in the up and down movements of the link 35 the shutter diaphragm will be closed or opened. It will be understood that the traveler 31 may be adjusted to any position along the screw shaft 29 to vary the position of the bar 34 with respect to the vertical plane of the diaphragm, and that by adjustment of the sleeve 36 the height of said sleeve and its throw may be regulated, thus adapting such parts of the attachment to be applied to cameras of different widths and different distances of the lens casing from the base board. Also it will be understood that by the sliding connection of the shaft sections 23 and 24 the distance between the frame or housing 11 and the bearing 20 may be varied to suit camera bodies or boxes of different lengths.

The shaft member 24 carries a beveled gear 41 which meshes with a beveled gear 42 on one end of an operating handle 43 having an actuating knob 44 at its opposite end, which handle is movable over the dial or scale plate 13 and carries an adjustable indicating member 45 for coöperation with the graduations or indices thereon. By moving this handle laterally over the plate to register with one or the other of the graduations of the scale plate the extensible shaft will be rotated through the connecting gearing to swing the arm 27 upwardly or downwardly to a greater or less degree, whereby the link 35 will be actuated for diaphragm closing or opening movements to corresponding degrees, as will be readily understood. The scale plate 13 and operating handle 43 are located above the baseboard 2 at a point in rear of the back of the camera, so that the diaphragm may be operated from the rear, while the camera is being focused, thus obviating the necessity of the operator going to the front of the camera to adjust the diaphragm to a certain stop measure, as will be readily understood.

The frame or housing 11 is bent or looped to form a casing or receptacle for an ordinary dry battery cell 47. As shown, the handle 43 is hollow for the passage of conducting wires 48 and 49 which are connected at one end with the respective poles of the battery. The terminal of one wire is connected to one terminal of an incandescent lamp 50, and the terminal of the other wire to a spring retracted push button 51, mounted in the knob 44, the construction and arrangement being such that when the push button is pressed inward the other contacts of the same and the lamp will be connected to close the circuit from the battery, thus causing the lamp to glow, while when the push button is retracted or elevated the circuit will be broken and the flow of current cut off. Thus it will be understood that the operator may at any time during the focusing operation cause the lamp to glow to illuminate the scale plate within the darkened space formed by the focusing cloth, so that the operator may adjust the handle to any desired degree without the necessity of removing the focusing cloth from his head.

It will be seen from the foregoing description that the invention provides an attachment for cameras by means of which the diaphragm governing the light opening may be adjusted to regulate the size of the opening, and that such action may be performed from a point in rear of the camera body during the focusing action, without the inconvenience trouble and loss of time ordinarily required through the necessity of the operator going to the front of the camera for this purpose. It will also be seen that the attachment is adjustable for application to cameras of different sizes and to operate diaphragms of different sizes or at different distances from the side and base of the camera frame.

The means for connecting the link 35 with the diaphragm may vary as desired. In Fig. 7 I have shown a modified means consisting of a strap or band 52 which embraces the lens casing, one end of such band being provided with an eye 53 for pivotal connection with the link 35, while the opposite end of the band carries a bracket 54 having a slot 55 for the reception and passage of the opposite end 56 of the band, a cam member 57 being provided upon the bracket 54 to engage the end 53 and clamp the same in adjusted position, to hold the band in place. A friction band or strip 58, of rubber or other suitable material, is provided to hold the band in engagement with the rim of the diaphragm, thus forming a positive connection whereby in the movements of the band 52, through the movements of the link 35, the diaphragm will be operated.

In Fig. 8 I have shown another modified form of motion transmitting connection between the link and diaphragm, the same comprising a wire band 59 having one of its ends connected with a bracket 60 having an opening 61 for passage of the opposite end of the band which is threaded to receive an adjusting and holding nut 62, whereby the wire band may be held in engagement with the peripheral portion of the diaphragm. The bracket 60 is provided with an eye 63 for pivotal connection with the link 35, as will be readily understood.

I claim:—

1. In a device for operating the diaphragms of cameras, the combination of a diaphragm actuating element, operating means therefor including an operating element at the rear of the camera, and means coöperating with said operating element for indicating degrees of movement thereof, and means for removably mounting all of said means on the camera.

2. In a device for operating camera diaphragms, the combination of a diaphragm actuating element, an operating member therefor disposed in rear of the camera and within the zone covered by the focusing cloth, an indicator coöperating with said operating member for indicating degrees of adjustment thereof, and means for illuminating said indicating member.

3. In a device for actuating the diaphragms of cameras, the combination of a diaphragm actuating element, an operating member therefor at the rear of the camera and within the zone covered by the focusing cloth, a graduated scale over which said operating element is movable, and means carried by the operating element for illuminating said scale.

4. In a device for actuating camera diaphragms, the combination of a diaghragm actuating element, an operating device therefor, including a handle, arranged at the rear of the camera and within the zone covered by the focusing cloth, a graduated scale over which said handle is movable, an electrical illuminating means, whereby the scale may be illuminated, and a switch upon the handle for energizing said illuminating means.

5. In a device for operating camera diaphragms, the combination of an extensible shaft arranged at one side of the camera and extending longitudinally thereof, clamps for removably securing said shaft to the camera, supporting means for said extensible shaft, means for rotating said shaft, a vertically movable arm actuated by the shaft, and means for transmitting motion from said arm to the diaphragm.

6. In a device for actuating camera diaphragms, the combination of a diaphragm, a longitudinal shaft disposed at one side of the camera and extending longitudinally thereof, supporting means for said shaft removably engaging the camera, means arranged at the rear of the camera for rotating said shaft, and means arranged at the front of the camera and actuated by the shaft for opening and closing the diaphragm.

7. In a device for operating camera diaphragms, the combination of a diaphragm, a rotary shaft at one side of and parallel with the camera, a swinging arm at the front of the camera operated by said shaft, means arranged at the rear of the camera for operating the shaft, a vertically movable bar actuated by the arm, means for adjusting said bar along said arm, and an operating connection between the arm and the diaphragm.

In testimony whereof I affix my signature.

JOHN A. ANDRUSHES.

Witnesses:
JOHN KARUZAS,
ADOLF J. KUBILINS.